US009253174B1

(12) United States Patent
Rowe

(10) Patent No.: US 9,253,174 B1
(45) Date of Patent: Feb. 2, 2016

(54) PROVIDING A SECOND FACTOR AUTHORIZATION

(71) Applicant: Simon Michael Rowe, Berkshire (GB)

(72) Inventor: Simon Michael Rowe, Berkshire (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/781,484

(22) Filed: Feb. 28, 2013

(51) Int. Cl.
*H04L 29/00* (2006.01)
*H04L 29/06* (2006.01)

(52) U.S. Cl.
CPC ........................................ *H04L 63/08* (2013.01)

(58) Field of Classification Search
None
See application file for complete search history.

(56) References Cited

U.S. PATENT DOCUMENTS

| 7,788,713 | B2 * | 8/2010 | Grobman et al. | 726/12 |
| 8,200,818 | B2 * | 6/2012 | Freund et al. | 709/225 |
| 2005/0198319 | A1 | 9/2005 | Chan et al. | |
| 2006/0101261 | A1 | 5/2006 | Lee et al. | |
| 2009/0031413 | A1 | 1/2009 | Chang et al. | |
| 2012/0144461 | A1 * | 6/2012 | Rathbun | 726/5 |
| 2013/0232558 | A1 * | 9/2013 | Brown et al. | 726/4 |

FOREIGN PATENT DOCUMENTS

WO    0201331 A2    1/2002

* cited by examiner

*Primary Examiner* — Brandon Hoffman
*Assistant Examiner* — Helai Salehi
(74) *Attorney, Agent, or Firm* — Foley and Lardner LLP; John D. Lanza

(57) ABSTRACT

A system for generating a second factor authorization for a request to access a web site includes a data store having a computer readable medium storing a program for generating the second factor authorization, and a processor. A packet receiving unit receives the request from a user device via a local network to access the web site via an external network. A trigger database stores the web site. A device database stores a rule associated with the user device for the web site, and a corresponding paired device with the user device. A second factor determination unit requests a second factor authorization from the corresponding paired device in response to the packet receiving unit receiving the request. A communication unit communicates the request to the external network in response to a valid assertion from the paired device based on the second factor authorization.

20 Claims, 4 Drawing Sheets

PROVIDING A SECOND FACTOR AUTHORIZATION

BACKGROUND

A location may be associated with multiple devices equipped to access an external network, such as the Internet. For example, the location may have a smart phone, a tablet, a personal computer, or Internet (ITV) capable of accessing the Internet. The devices may access the internet via an access point, such as a router.

During the normal course of operation, the devices may become infected with malware. Malware is an application that is loaded on one of the devices, and has the capability to access web sites within the device user's express permission. The malware may be used to access inappropriate sites, or access sites that allow a third-party to gain sensitive information (such as a bank account).

Techniques to detect maleware may be in place, such as providing software to detect an inbound attack on the device. However, such techniques may be ineffective due to an Inability to detect the malware during inbound traffic.

Another technique may be to scan the device to detect if malware is present on the device. However, once again the malware may be designed to avoid detection. Further, the malware prior to detection, may have already compromised the device and the user's personal information associated with the device. Thus, this solution may be ineffective to prevent malicious activities from occurring due to the device being affected with malware.

SUMMARY

A system for generating a second factor authorization for a request to access a web site, includes a data store comprising a computer readable medium storing a program of instructions for generating the second factor authorization; a processor that executes the program of instructions; a packet receiving unit to receive the request from a user device via a local network, to access the web site via an external network; a trigger database to store the web site; a device database to store a rule associated with the user device for the web site, and to store a corresponding paired device with the user device; a second factor determination unit to request a second factor authorization from the corresponding paired device in response to the packet receiving unit receiving the request; and a communication unit to communicate the request to the external network in response to a valid assertion from the paired device based on the second factor authorization.

DESCRIPTION OF THE DRAWINGS

The detailed description refers to the following drawings, in which like numerals refer to like items, and in which.

DETAILED DESCRIPTION

A specific user at a location may utilize multiple devices to access the Internet. For example, the user may employ a personal computer to access and browse the Internet. In addition, the user may also carry a smart phone, equipped to access the Internet.

Disclosed herein are techniques to utilize multiple devices to protect a user or user's device from being compromised from malware. By utilizing a second device to detect and authorize traffic to and from a first device, a user's device is protected from malware.

The concepts disclosed herein detect a specific request from a user device, such as a request for access to personal sites such as banks and the like via an access point, such as a router. The router may prohibit the request and send a message to a second device associated with the user. This may be a smart phone being carried by the user, or any second device configured to receive this message. The user may then authorize the specific request from the first device, or prohibit the request, thereby ensuring that personal information is not compromised.

In situations in which the systems discussed here collect personal information about users, or may make use of personal information, the users may be provided with an opportunity to control whether programs or features collect user information (e.g., Information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 1:
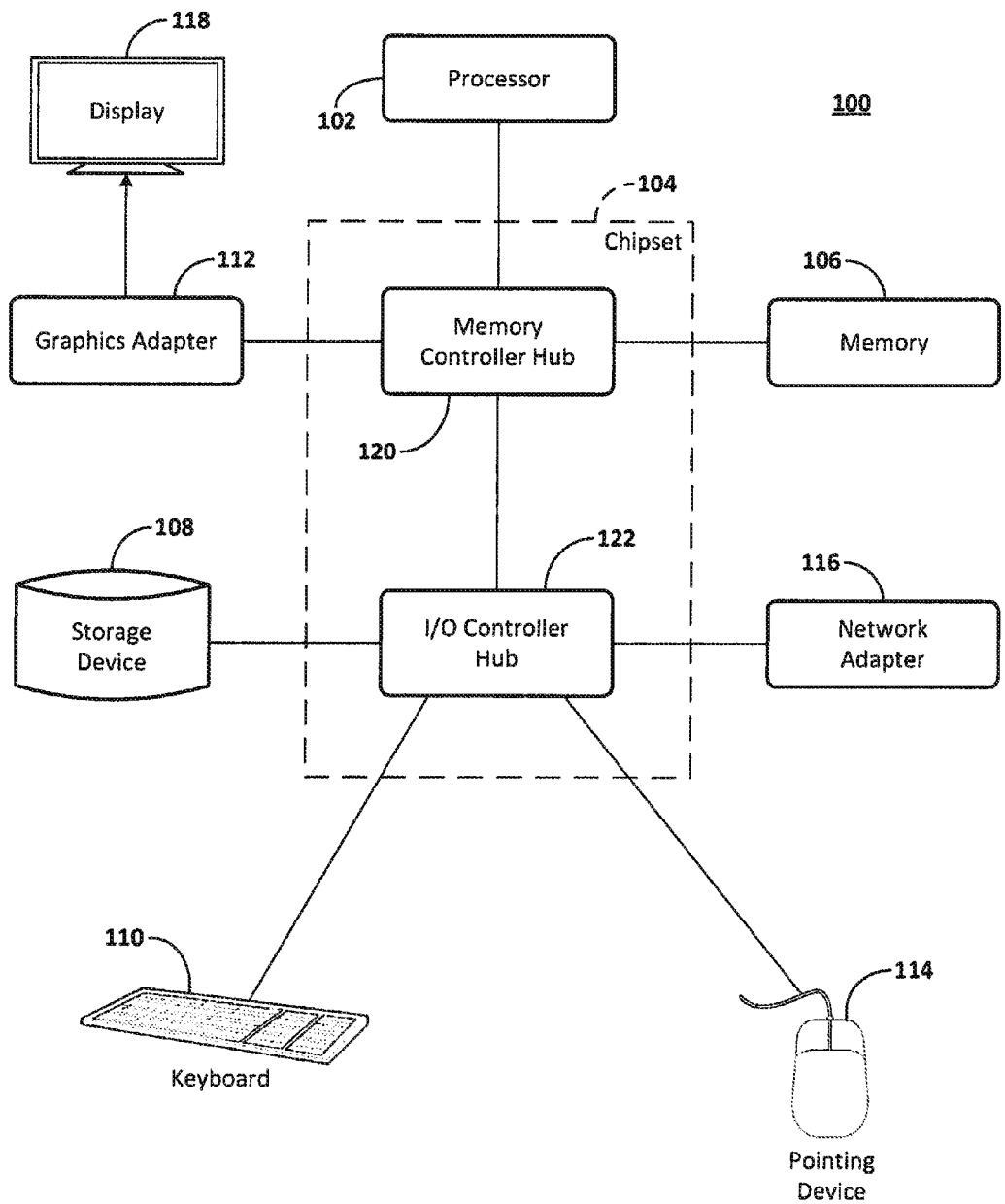
FIG. 1 is a block diagram illustrating an example computer.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data store, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
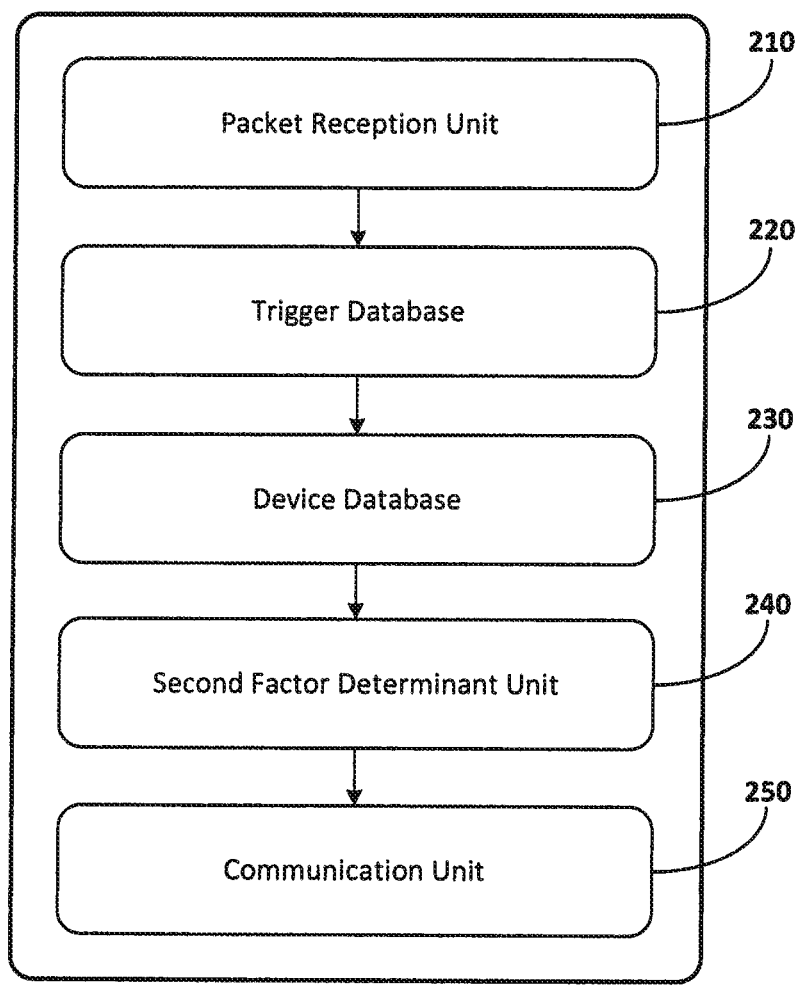
FIG. 2 illustrates an example of a system for providing a second factor authorization.

FIG. 2 illustrates an example of a system for providing a second factor authorization. The system 200 includes a packet reception unit 210, a trigger database 220, a device database 230, a second factor determination unit 240 and a communication unit 250. The system 200 may be implemented in a router associated with a location, or as part of a software proxy associated with an external computer, such as a server.

The packet reception unit 210 receives all requests from devices associated with a location to an external network. For example, if a device associated with the location accesses a web site, the packet reception unit 210 receives this request first. The packet reception unit 210 serves as a gateway for the devices associated with the location to the external network, such as the Internet.

The trigger database 220 stores web sites and rules associated with triggering the protections afforded by system 200. Thus, a user or system 200 operator may populate the trigger database 220 with web sites that they believe to be vulnerable to attacks from malware. For example, a user may routinely access a bank web site to perform online banking and to access personal information and funds. Thus, the user or the operator may predefine the bank web site as being provided with extra scrutiny.

The list of web sites that are associated with extra scrutiny may also be provided by a third party trusted source. Thus, the system 200 may communicate with the third party trusted source, and receive an updated list of sites of a certain scope. These sites may require extra scrutiny. For example, the third party trusted source may communicate certain sites associated with financial institutions, sites related to known phishing schemes, or sites of a certain theme (i.e. adult related sites).

Additionally, the trigger database 220 may also be employed to store rules associated with accessing an external network. For example, the trigger database 220 may contain a rule that a subsequent access to bank web site A may not occur after a predetermined time from an initial access. The various rules may be configured and implemented based on a user or operator's desired protection.

The device database 230 maintains a record of a device associated with the location and the corresponding rules of authentication associated with each device. Thus, each device may be denoted as a device being scrutinized with the rules associated with the device database 230, or as a device used to verify or authenticate another device. Further, the rules associated with each device may be tailored for the devices purpose. For example, a child's computer may be associated with rules that prevent the child from accessing certain sites of an adult nature. Thus, each device may receive scrutiny for all, some or none of the list of web sites or rules stored in the trigger database 220.

The devices may also be denoted as devices for verifying another device. Devices may be grouped or paired for this purpose. For example, user A's personal computer may be paired with user A's smart phone, and user B's personal computer may be paired with user B's tablet. In this way, the user associated with the device potentially being compromised via malware is alerted to the compromise.

The second factor determination unit 240 determines if the request received by the packet reception unit 210 matches the sites stored in the trigger database 220 for the corresponding device according to the device database 230. Based on the incoming requests satisfying the rules per device, a determination is made to request a second factor authorization. A second factor authorization is a request to a paired device. The request to the paired device prompts a response as to whether the request to the packet reception unit 210 is valid or not valid. If the determination is made, a second factor is communicated to the paired device authorized to permit and authenticate traffic.

Thus, if a smart phone is communicated a second factor authorization due to a personal computer that had previously been paired with the smart phone, the smart phone operator may permit the request to proceed if the smart phone operator believes that the request to be a valid request, or block the request if the smart phone operator believes the Internet request is not valid.

Alternatively, the second factor determination unit 240 may be equipped with a timer function associated with a predetermined time. If a second factor authorization is not received within the predetermined time, the second factor determination unit 240 automatically may determine that the request is not valid.

The communication unit 250, based on the second factor determination unit 240, communicates the request to the external network. Thus, if the second factor determination unit 240 determines the request is valid, the communication unit 250 communicates the request. If the second factor determination unit 240 determines the request is not valid, the request is blocked until an operator overrides the second factor authorization.

Further, the communication unit 250, after receiving an indication that the request is valid from the second factor determination unit 240, may determine that all requests sourced from the authorized device are valid for a predetermined time. For example, after receiving an Indication of valid from the second factor determination unit 240, the requests received from the requesting device may be allowed without the generation of a subsequent second factor authorization for the predetermined time.

Figure 3:
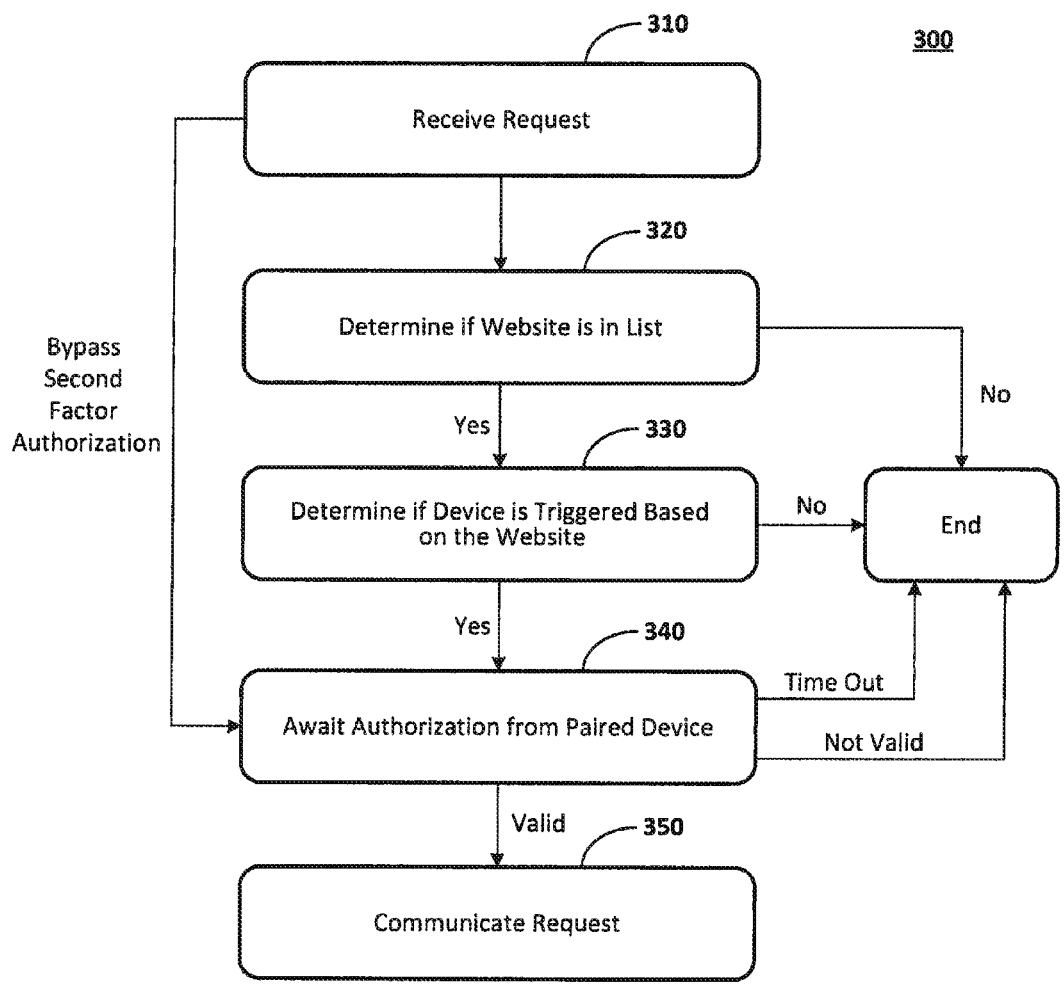
FIG. 3 illustrates an example of a method 300 for providing a second factor authorization.

FIG. 3 illustrates an example of a method 300 for providing a second factor authorization. The method 300 may be implemented on the system 200 depicted in FIG. 2.

In operation 310, a request to access content from an external network is received from a device associated with a location. The method 300 is employed at a place in which all data communicated between the devices associated with the location and an external network is situated. For example, locations may be associated with an access point, such as a router that serves this purpose. The request may be generated from a personal computer's user requesting access to a web site.

In operation 320, the request made in operation 310 is cross-referenced with a list of web sites previously determined to be associated with a second factor authorization. A user or system 200 operator may populate the list with web sites believed to be vulnerable to attacks from malware. For example, a user may routinely access a bank web site to perform online banking and to access personal information and funds. Thus, the user or the operator may predefine the bank web site as being provided with extra scrutiny.

The list of web sites that are associated with extra scrutiny may also be provided by a third party trusted source. Thus, the third party trusted source communicates an updated list of sites of a certain scope. These sites may require extra scrutiny. For example, the third party trusted source may communicate certain sites associated with financial institutions, sites related to known phishing schemes, or sites of a certain theme (i.e. adult related sites).

In operation 330, the device that generated the request in operation 310 is identified. Once the device is known, the appropriate set of rules and device associations may be determined as well. Different devices may be set to have different web sites that trigger a second factor authorization. For example, devices associated with adults in a location may be authorized to access certain content, while devices associated with non-adults may be blocked from doing so.

Further, different devices may be paired differently from each other. For example, user A's personal computer may be paired with user A's smart phone, and user B's personal computer may be paired with user B's tablet. In this way, the user associated with the device potentially being compromised via malware is alerted to the compromise.

In operation 340, based on the rules and web sites cross-referenced in operation 320 with the device identified in operation 330, a determination is made to communicate a second factor authorization to a paired device. Thus, if the device associated with the request made in operation 310 is flagged, a second factor authorization may be transmitted to a paired device. As explained in operation 330, the paired device may be predetermined.

Alternatively, the amount of time to receive an answer to the second factor authorization may be equipped with a timer function associated with a predetermined time. If a second factor authorization is not received within the predetermined time, the request may automatically be deemed not valid.

In operation 350, if a response from the paired device is that the request is not valid, for example the operator of the paired device indicates that the request is from an unauthorized source, such as malware, the request is blocked. Conversely, if the response from the paired device is that the request is valid, the request is communicated to the external network.

Further, after receiving an indication that the request is valid, a system implementing method 300 may determine that all requests sourced from the authorized device are valid for a predetermined time. For example, after receiving an indication of valid, the requests received from the requesting device may be allowed without the generation of a subsequent second factor authorization for the predetermined time.

Figure 4:
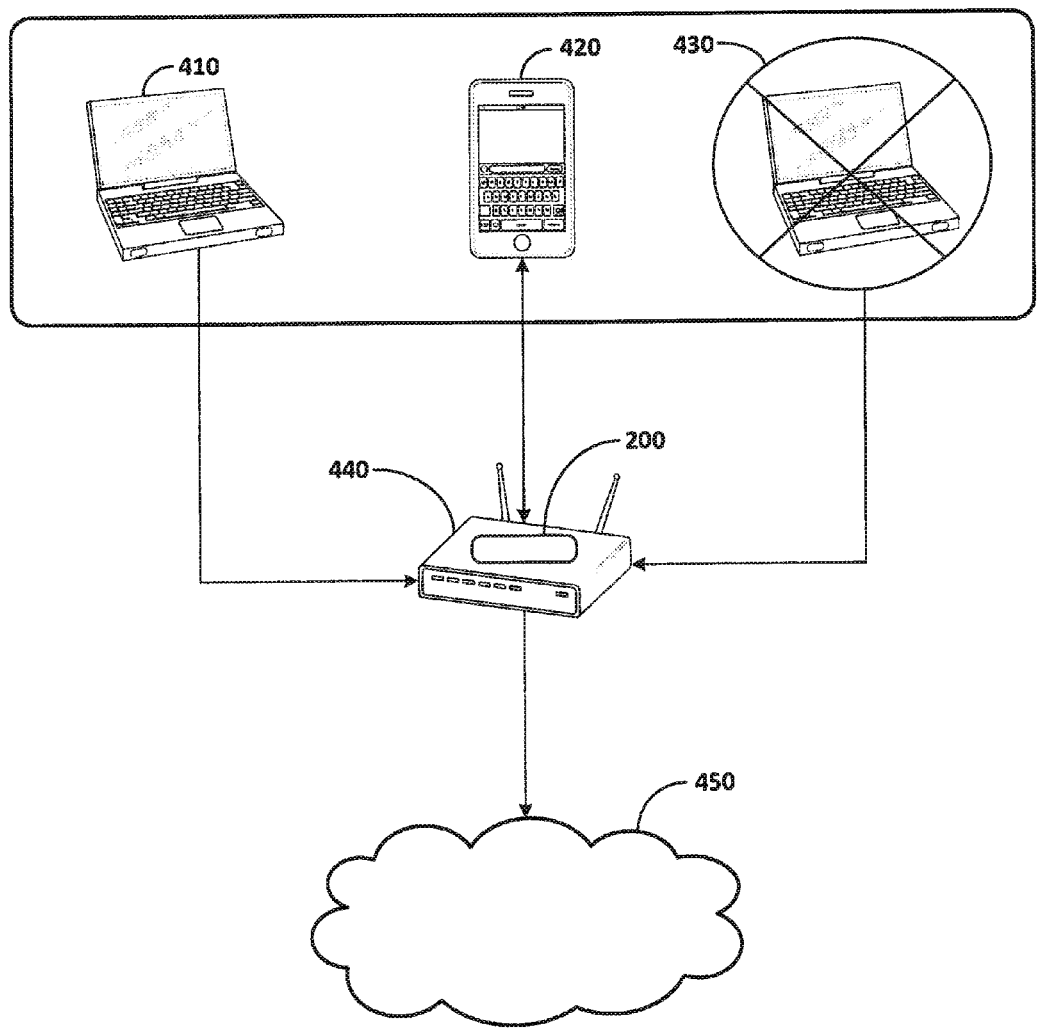
FIG. 4 is an example implementation of the system in FIG. 2.

FIG. 4 is an example of system 200 being implemented in a location 400. Shown in FIG. 4 is a location 400 with two personal computers, 410 and 430, a smart phone 420. The three devices connect to a network 450 via a router 440. The router 440 includes system 200. The system 200 may be implemented as firmware loaded onto the router. Alternatively, the system 200 may be implemented as a software proxy loaded on an external machine (not shown).

A personal computer 410 user may request access the network 450, to access a personal site, such as a bank web site. The system 200 receives the request, and subsequently determines that the personal computer 410 is paired with smart phone 420. The system 200 may then transmit a message to smart phone 420 requesting a second factor authorization. The user, who may control smart phone 420 as well, can confirm that the request is valid, and allow the request to proceed to network 450.

Conversely, personal computer 430 may be infected with malware. The malware may be programmed to attempt to access the user's personal information, such as a bank account associated with the user. Thus, through malware, personal computer 430 may request access to a bank web site via the router 440 and the network 450.

Employing the aspects disclosed herein, system 200 may ascertain that the bank web site is on a list associated with necessitating a second factor authorization. In the example shown, the personal computer 430 may be paired with the smart phone 420. Thus, the user of smart phone 420 may determine that the request to the bank web site is not valid. At this Juncture, router 440 may prohibit the personal computer 430 from accessing the network 450.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 3. The disclosed devices, components, and systems contemplate using or implementing any suitable technique for performing the steps illustrated in these figures. Thus, FIG. 3 is for illustration purposes only and the described or similar steps may be performed at any appropriate time, including concurrently, Individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and Interconnected by a communication network.

To provide for interaction with an individual, the herein disclosed embodiments can be implemented using an Interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

I claim:

1. A method for generating a second factor authorization for a request to access a web site, comprising:
   receiving, by a gateway device deployed as an intermediary between a first network and a second network, a request to access a web site hosted by a server connected to the second network from a first user device connected to the first network;
   determining, by the gateway device, that a trigger database identifies the web site as requiring second factor authorization;
   requesting, by the gateway device, a second factor authorization from a second user device paired with the first user device, responsive to receiving the request; and
   communicating the request to the server connected to the second network, by the gateway device, responsive to receiving a valid second factor authorization from the second user device.

2. The method according to claim 1, wherein the web site is sourced from a third party trusted source.

3. The method according to claim 1, further comprising storing, in the trigger database, a rule associated with the web site.

4. The method according to claim 1, further comprising, in response to the second user device failing to indicate that the request is valid or not valid after a predetermined time, blocking the request.

5. The method according to claim 1, further comprising bypassing the request for the second factor authorization based on a predetermined setting to disable the second factor authorization.

6. The method according to claim 1, wherein the gateway device comprises a router.

7. The method according to claim 1, wherein the gateway device comprises a software proxy on a processor associated with a server gateway that communicates with the external network.

8. The method of claim 1, wherein determining that the trigger database identifies the web site as requiring second factor authorization further comprises determining that the trigger database identifies a combination of the web site and the first user device as requiring second factor authorization.

9. The method of claim 1, further comprising receiving, by the gateway device, from a second server connected to the second network, an identification of the web site for inclusion in the trigger database; and adding the web site to the trigger database, by the gateway device, responsive to receipt of the identification from the second server.

10. The method according to claim 3, wherein the rule is triggered by a second attempt by the first user device to generate the request within a predetermined time after a first attempt is made.

11. The method according to claim 4, further comprising, in response to the second user device indicating the request is valid, communicating subsequent requests similar to the request made within the predetermined time so as to bypass the request for the second factor authorization.

12. A system for generating a second factor authorization for a request to access a web site, comprising:
   a gateway device deployed as an intermediary between a first network and a second network, the gateway device comprising a first network interface to the first network, a second network interface to the second network, a memory device storing a trigger database, and an authorization engine executed by a processor, the authorization engine configured for:
      receiving a request to access a web site hosted by a server connected to the second network from a first user device connected to the first network,
      determining that the trigger database identifies the web site as requiring second factor authorization, requesting a second factor authorization from a second user device paired with the first user device, responsive to receiving the request, and communicating the request to the server connected to the second network, responsive to receiving a valid second factor authorization from the second user device.

13. The system of claim 12, wherein the web site is sourced from a third party trusted source.

14. The system of claim 12, wherein the authorization engine is further configured for storing, in the trigger database, a rule associated with the web site indicating to communicate a second request to the server, responsive to receipt by the gateway device of a second request to access the web site from the first user device within a predetermined time after receiving the valid second factor authorization from the second user device.

15. The system of claim 12, wherein the authorization engine is further configured for, in response to the second user device failing to indicate that the request is valid or not valid after a predetermined time, blocking the request.

16. The system of claim 12, wherein the authorization engine is further configured for bypassing the request for the second factor authorization based on a predetermined setting to disable the second factor authorization.

17. The system of claim 12, wherein the gateway device comprises a router.

18. The system of claim 12, wherein the gateway device comprises a software proxy on a processor associated with a server gateway that communicates with the external network.

19. The system of claim 12, wherein the authorization engine is further configured for determining that the trigger database identifies a combination of the web site and the first user device as requiring second factor authorization.

20. The system of claim 12, wherein the authorization engine is further configured for:

receiving from a second server connected to the second network, an identification of the web site for inclusion in the trigger database; and adding the web site to the trigger database, responsive to receipt of the identification from the second server.

* * * * *